US008646188B1

(12) United States Patent
Ligotti, III (10) Patent No.: US 8,646,188 B1
(45) Date of Patent: Feb. 11, 2014

(54) GOLF CLUB MEASUREMENT DEVICE (71) Applicant: Callaway Golf Company, Carlsbad, CA (US)

(72) Inventor: Peter Ligotti, III, Encinitas, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 14/042,207

(22) Filed: Sep. 30, 2013

Related U.S. Application Data (63) Continuation of application No. 13/271,088, filed on Oct. 11, 2011, now Pat. No. 8,572,859.

(60) Provisional application No. 61/392,884, filed on Oct. 13, 2010.

(51) Int. Cl.
*G01B 5/24* (2006.01)
(52) U.S. Cl.
USPC .............................................. 33/508; 33/534
(58) Field of Classification Search
USPC .................................... 33/508, 534
See application file for complete search history.

(56) References Cited

U.S. PATENT DOCUMENTS

| | | | | | |
|---|---|---|---|---|---|
| 2,822,614 | A | * | 2/1958 | Susinno | 33/263 |
| 2,898,109 | A | * | 8/1959 | Williams | 33/263 |
| 3,208,150 | A | * | 9/1965 | Rhodehamel | 33/508 |
| 3,293,762 | A | * | 12/1966 | Karsten | 33/508 |
| 4,094,072 | A | * | 6/1978 | Erb | 33/508 |
| 4,817,294 | A | * | 4/1989 | Lai | 33/508 |
| 4,858,332 | A | * | 8/1989 | Thomas | 33/508 |
| 5,105,550 | A | * | 4/1992 | Shenoha | 33/508 |
| 5,421,098 | A | * | 6/1995 | Muldoon | 33/508 |
| 6,430,829 | B1 | * | 8/2002 | Williamson et al. | 33/508 |
| 6,449,860 | B1 | * | 9/2002 | Nakai | 33/508 |
| 6,508,007 | B1 | * | 1/2003 | Muldoon | 33/508 |
| 8,572,859 | B2 | * | 11/2013 | Ligotti, III | 33/508 |
| 2003/0005593 | A1 | * | 1/2003 | Muldoon | 33/508 |
| 2009/0144997 | A1 | * | 6/2009 | Wang | 33/508 |
| 2012/0090186 | A1 | * | 4/2012 | Ligotti, III | 33/508 |

* cited by examiner

*Primary Examiner* — Yaritza Guadalupe-McCall
(74) *Attorney, Agent, or Firm* — Rebecca Hanovice; Michael A. Catania; Sonia Lari (57) ABSTRACT

A portable golf club face measurement device, which accurately and quickly measures data regarding, for example, the orientation of the golf club face relative to the shaft and the orientation of the golf club face relative to a point located on the toe of the club, is disclosed herein. The measurement device has a face probe, a retaining arm, at least one gauge, and at least one clamp.

20 Claims, 7 Drawing Sheets

GOLF CLUB MEASUREMENT DEVICE

CROSS REFERENCES TO RELATED APPLICATIONS

The present application is a continuation of U.S. patent application Ser. No. 13/271,088, filed on Oct. 11, 2011, which claims priority to U.S. Provisional Application No. 61/392,884, filed on Oct. 13, 2010.

STATEMENT REGARDING FEDERALLY SPONSORED RESEARCH OR DEVELOPMENT

Not Applicable

BACKGROUND OF THE INVENTION

1. Field of the Invention

The present invention relates to a device that can be used to measure the orientation and position of a golf club face. The present invention particularly relates to a golf club face measurement device that is portable.

2. Description of the Related Art

Golfers often wish to measure the orientation and/or position of a golf club face in order to more accurately fit their golf club equipment to their unique swings, for example. The golf industry has provided many devices that can be used to measure a golf club face, including those described in U.S. Pat. Nos. 2,546,426, 2,912,762, 2,973,581, 3,631,602, 4,094,072, 4,245,392, 4,875,293, 4,977,680, 5,105,550, 6,363,620, 6,449,860, 6,508,007, 6,941,670, 7,010,965, and 7,164,473.

One disadvantage of prior art devices is their lack of portability. Many of these devices are large, heavy, and in many cases permanently or semi-permanently mounted to a work bench. In addition, many of these prior art devices are meant to be both a measurement and adjustment tool. Furthermore, many of these prior art measurement devices provide information only about loft and lie. These prior art measurement devices also can be very expensive to build and/or purchase. For example, the Coordinate Measurement Machine, or CMM, which is a piece of laboratory equipment routinely used by golf club manufacturers to measure golf club geometry, can cost several hundred thousands of dollars.

Ultimately, the prior art has failed to provide an optimized, portable golf club measurement device that can be purchased or made inexpensively.

BRIEF SUMMARY OF THE INVENTION

The measurement device of the present invention mounts easily to any golf club and reports several parameters that describe an angle or position of the club face relative to the golf club's shaft. This information enables the club to be used with impact monitor technologies, which will allow for correct analysis of the full orientation of the golf club at impact, both linear and angular components of velocity, and impact location. The measurement device of the present invention also identifies where on the golf club reflective markers should be placed for testing. The measurement device of the present invention can also be used as a loft or face angle gauge.

One aspect of the present invention is a golf club measurement device comprising a face probe, a retaining arm, at least one gauge, and a clamp, wherein the face probe has a through hole and at least two sides, wherein each side has at least one touch point, wherein the face probe is rotatably connected to the retaining arm, wherein the retaining arm is connected to the clamp, and wherein the at least one gauge provides measurement information when the clamp is attached to a golf club shaft and the through hole is lined up with a center of a golf club face.

In a further embodiment, the measurement information is selected from the group consisting of loft angle, lie angle, face angle, and distance. In another embodiment, each side of the face probe has two touch points. In a further embodiment, the through hole is located between the two touch points on each side of the face probe. In another embodiment, the measurement device further comprises a spacer. In yet another embodiment, the measurement device further comprises a retaining tube, wherein the retaining tube connects the face probe with the retaining arm. In a further embodiment, the measurement device further comprises a first gauge and a second gauge. In yet a further embodiment, the first gauge is disposed between the face probe and the retaining tube, and second other gauge is disposed between the retaining tube and the retaining arm. In another embodiment, the clamp has two or more clamping mechanisms.

Another aspect of the present invention is a method of measuring a golf club, comprising locating a center of a face on the golf club, attaching a measurement device to a shaft of the golf club, aligning the center of the golf club face within a face probe portion of the measurement device, and recording measurement values provided by at least one gauge on the measurement device. In a further embodiment, the measurement device comprises two or more gauges. In another embodiment, the method further comprises marking a point on a toe portion of the golf club, aligning the face probe portion with the point and recording measurement values provided by the at least one gauge. In another embodiment, the measurement values are selected from the group consisting of loft angle, lie angle, face angle, and distance.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
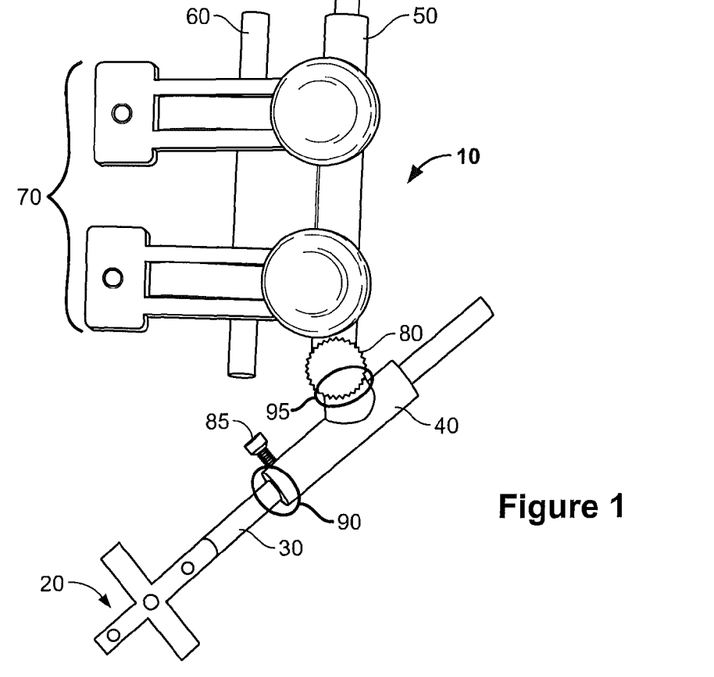
FIG. 1 is a side view of an embodiment of the present invention.
Figure 2:
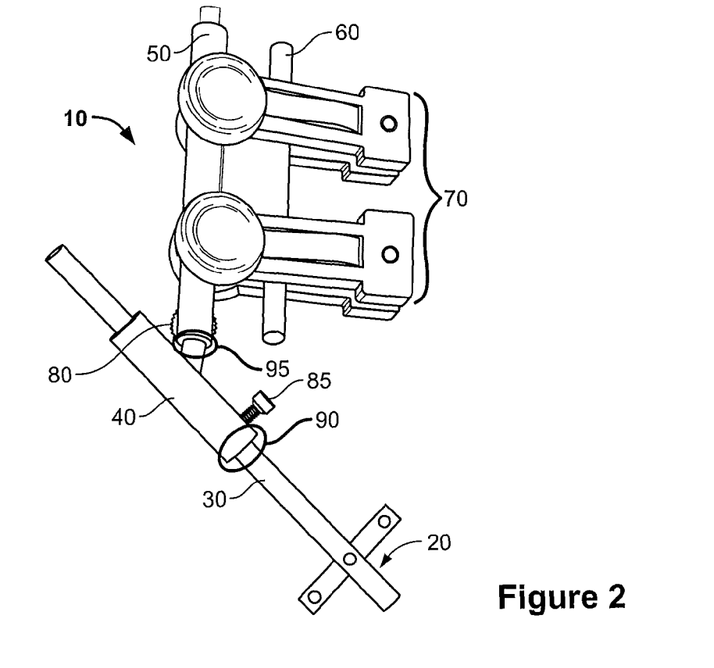
FIG. 2 is another side view of the embodiment shown in FIG. 1.

FIGS. 1 and 2 show a preferred embodiment of measurement device 10 of the present invention. The measurement device 10 includes a face probe 20, a probe arm 30, a retaining tube 40, a retaining arm 50, a spacer 60, a clamp 70, two tightening bolts 80, 85, and two gauges 90, 95.

Figure 3:
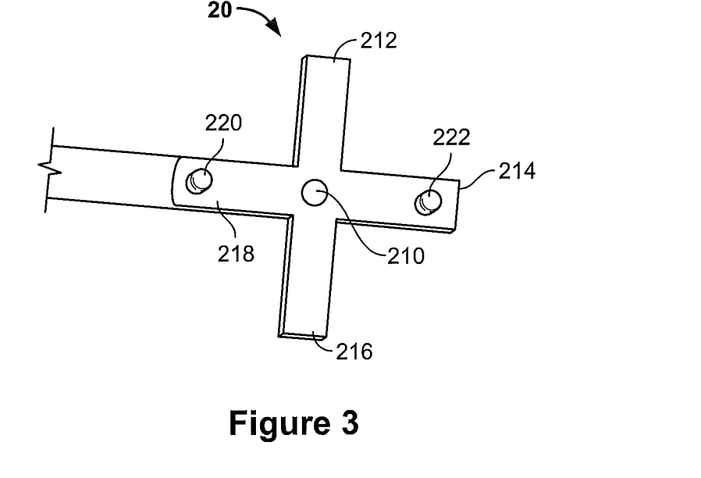
FIG. 3 is a side view of the face probe of the embodiment shown in FIG. 1.
Figure 4:
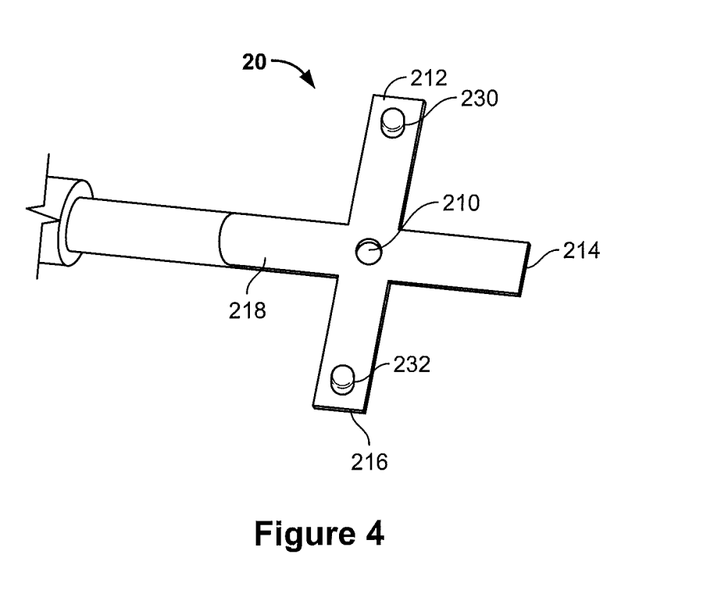
FIG. 4 is another side view of the face probe of the embodiment shown in FIG. 1.
Figure 5:
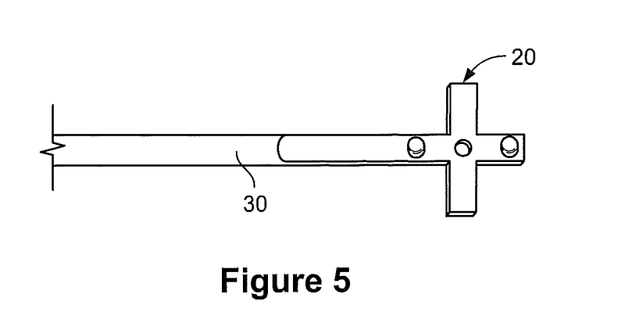
FIG. 5 is a plan view of the face probe and probe arm of the embodiment shown in FIG. 1.
Figure 7:
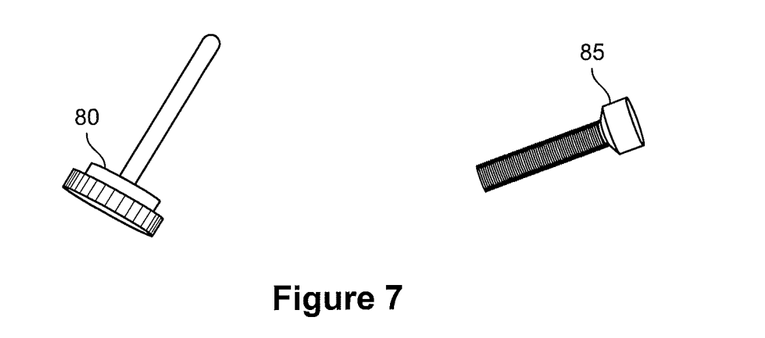
FIG. 7 is a side view of the tightening screws of the embodiment shown in FIG. 1.

FIGS. 3 and 4 show close-up views of the face probe 20, which includes a centrally-located sighting hole 210, three arms 212, 214, 216, and a stem 218. FIG. 3 shows that the stem 218 and one of the arms 214 include horizontal touch points 220, 222 disposed across from one another with the sighting hole 210 between them. FIG. 4 shows that two arms 212, 216 include vertical touch points 230, 232 disposed across from one another with the sighting hole 210 between them. FIG. 5 shows that the face probe 20 and probe arm 30 are formed as a unitary piece As shown in FIGS. 1 and 2, the probe arm 30 is threaded through the retaining tube 40, which connects the probe arm 30 to the retaining arm 50. When tightening bolt 85 is loosened, the probe arm 30 can rotate within the retaining tube 40 and thus enable the face probe 20 to flip over to expose the side having horizontal touch points 220, 222 or the side having vertical touch points 230, 232. The probe arm 30 can also move in and out of the retaining tube 40 when tightening bolt 85 is loosened. Tightening the tightening bolt 85 will prevent the probe arm 30 from rotating and moving in and out of the retaining tube 40, and will fix the face probe 20 at a desired orientation with respect to the rest of the measurement device 10. Tightening bolts 80, 85 are shown in more detail in FIG. 7.

Figure 6:
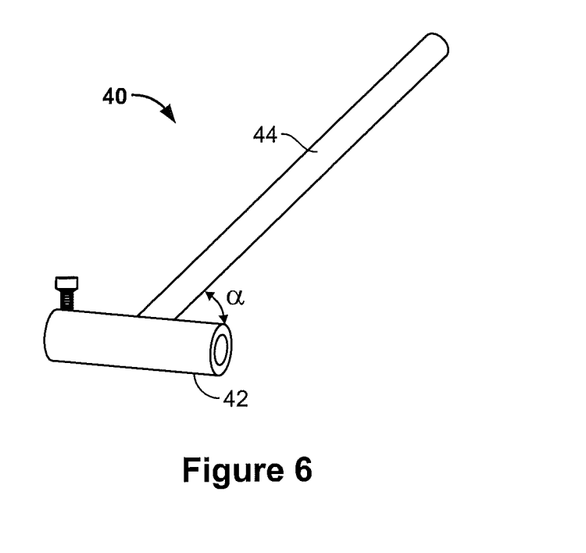
FIG. 6 is a side view of the retaining tube of the embodiment shown in FIG. 1.

As shown in FIG. 6, retaining tube 40 comprises a tube piece 42 and a connector piece 44 that extends from the tube piece 42 at an acute angle α. Connector piece 44 is slid into the opening 55 of retaining arm 50, shown in FIGS. 8 and 9, and tightening bolt 80 is fitted within bolt hole 82 and tightened to retain connector piece 44 within retaining arm 50 at a desired location. Loosening tightening bolt 80 allows the connector piece 44 to slide in and out of retaining arm 50 and to rotate within retaining arm 50, which consequently allows tube piece 42 to rotate. Rotation of tube piece 42 when the probe arm 30 is inserted within tube piece 42 causes the probe arm 30 (and therefore the face probe 20) to pivot towards or away from a golf club face.

Figure 8:
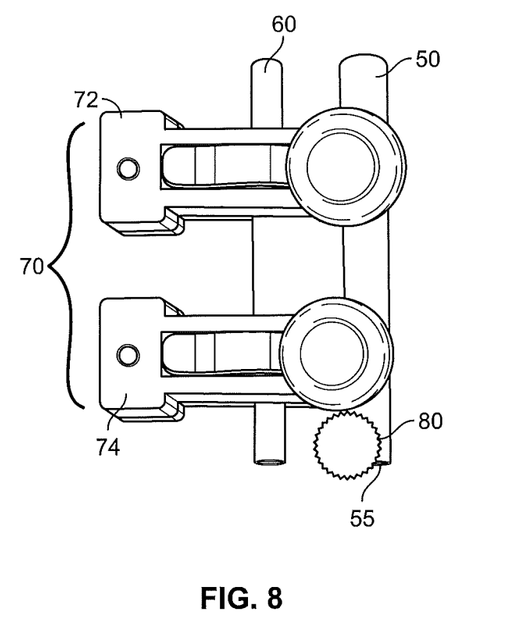
FIG. 8 is a side view of the clamp, retaining arm, and spacer of the embodiment shown in FIG. 1.
Figure 9:
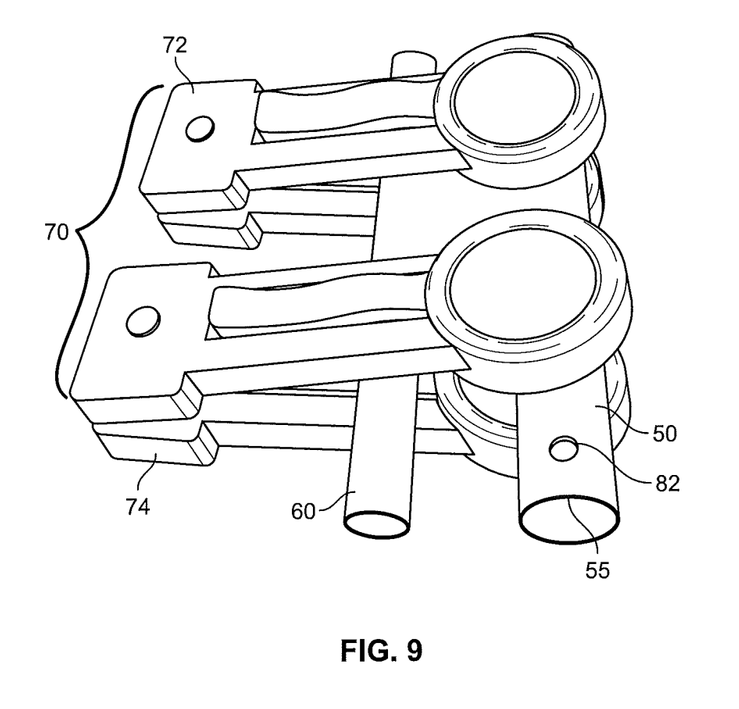
FIG. 9 is a perspective view of the clamp, retaining arm, and spacer shown in FIG. 8.

As shown in FIGS. 8 and 9, retaining arm 50 is preferably integrally formed with a spacer 60, which helps to locate the face probe 20 in front of a golf club face. In alternative embodiments, the retaining arm 50 and spacer 60 may be separate pieces that are connected through other means. FIGS. 8 and 9 also disclose clamp 70, which in the preferred embodiment includes two clamping mechanisms 72, 74 that are affixed to the spacer 60 after retaining arm 50 and spacer 60 are integrally formed. In alternative embodiments, the clamp 70 may comprise one or more than two clamping mechanisms, and may be integrally formed with the retaining arm 50 and/or the spacer 60.

Figure 10:
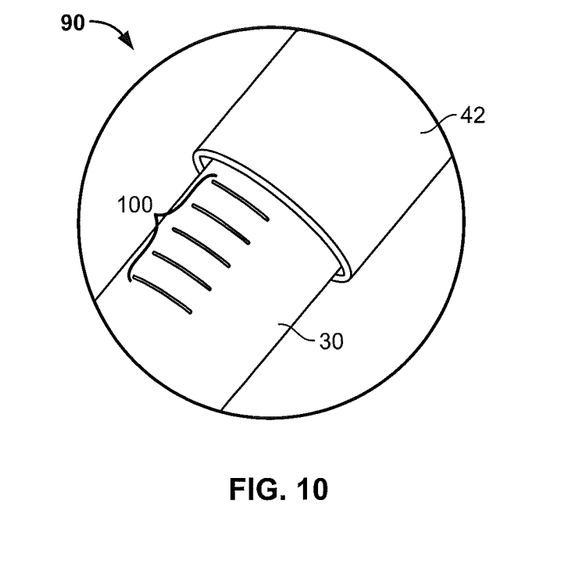
FIG. 10 is a perspective view of the circled connection between the tube piece of the retaining tube and the probe arm shown in FIG. 1.
Figure 11:
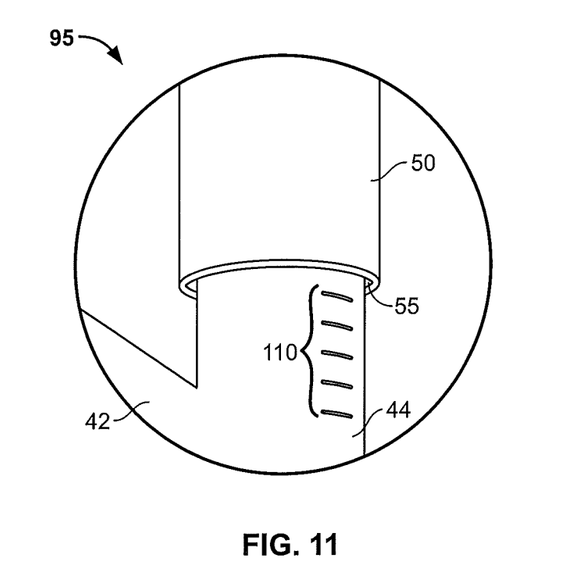
FIG. 11 is a perspective view of the circled connection between the connector piece of the retaining tube and the retaining arm shown in FIG. 1.

FIGS. 10 and 11 illustrate the gauges 90, 95 of the preferred embodiment. FIG. 10 shows gauge 90 where the probe arm 30 is inserted in the tube piece 42 of the retaining tube 40. The probe arm 30 has markings 100 on it that indicate, when the measuring device has been used with a golf club head, the angle of the golf club face with respect to the golf club shaft and the distance of the center of the golf club face from a shaft axis or other points on the golf club, for example. FIG. 11 shows the gauge 95 where the connector piece 44 of the retaining tube 40 is inserted through the opening 55 of the retaining arm 50 of the measuring device 10. The connector piece 44 also has markings 110 on it that indicate, when the measuring device has been used with a golf club head, the angle of the golf club face with respect to the golf club shaft and the distance of the center of the golf club face from a shaft axis or other points on the golf club, for example. The gauges 90, 95 may also measure additional or alternative features of the golf club orientation.

Figure 12:
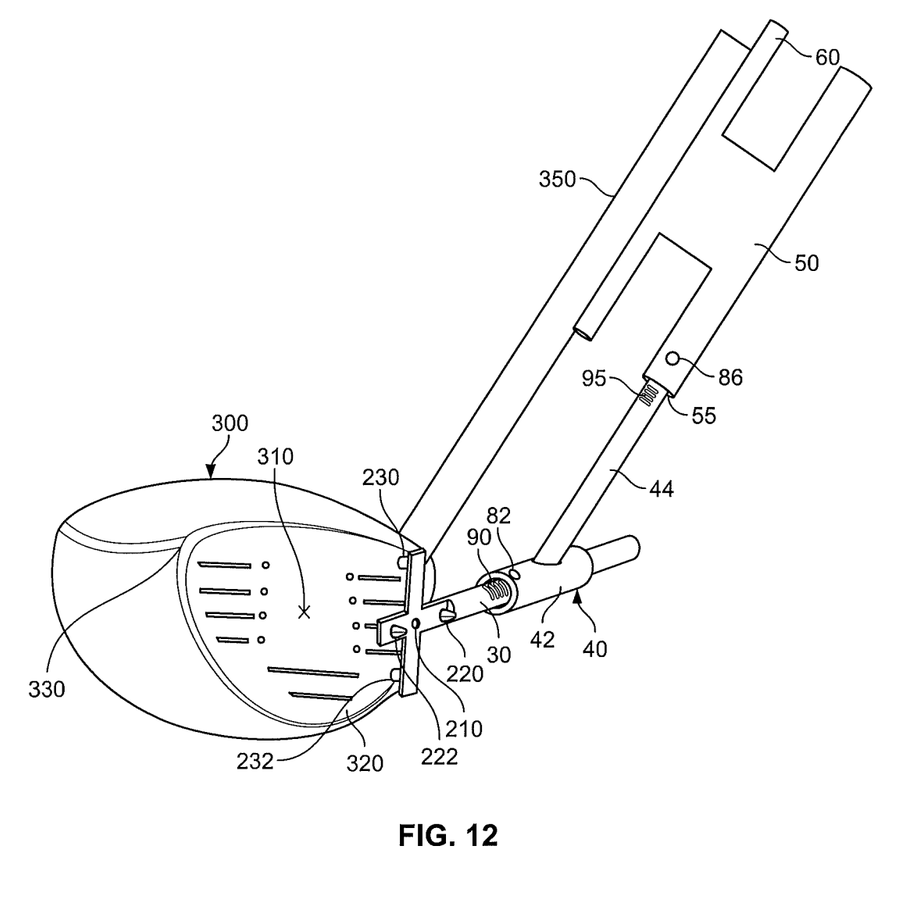
FIG. 12 is a side perspective view of the embodiment shown in FIG. 1 lined up with a representative golf club head.

FIG. 12 illustrates how the measuring device 10 is assembled with respect to a golf club head 300. Clamp 70 and tightening screws 80, 85 are omitted from this Figure for purposes of clarity. FIG. 12 shows that spacer 60 is lined up with and flush against a golf club shaft 350. The connector piece 44 of retaining tube 40 is inserted into the opening 55 in the retaining arm 50. Bolt hole 86 on the retaining arm 50 can receive tightening bolt 85 to fix the connector piece 44 within the retaining arm 50. The unitary piece comprising the face probe 20 and probe arm 30 is then inserted, probe arm 30 end first, into the tube piece 42 of the retaining tube 40. Bolt hole 82 on the tube piece 42 can receive tightening bolt 80 to fix the probe arm within the tube piece 42.

Figure 13:
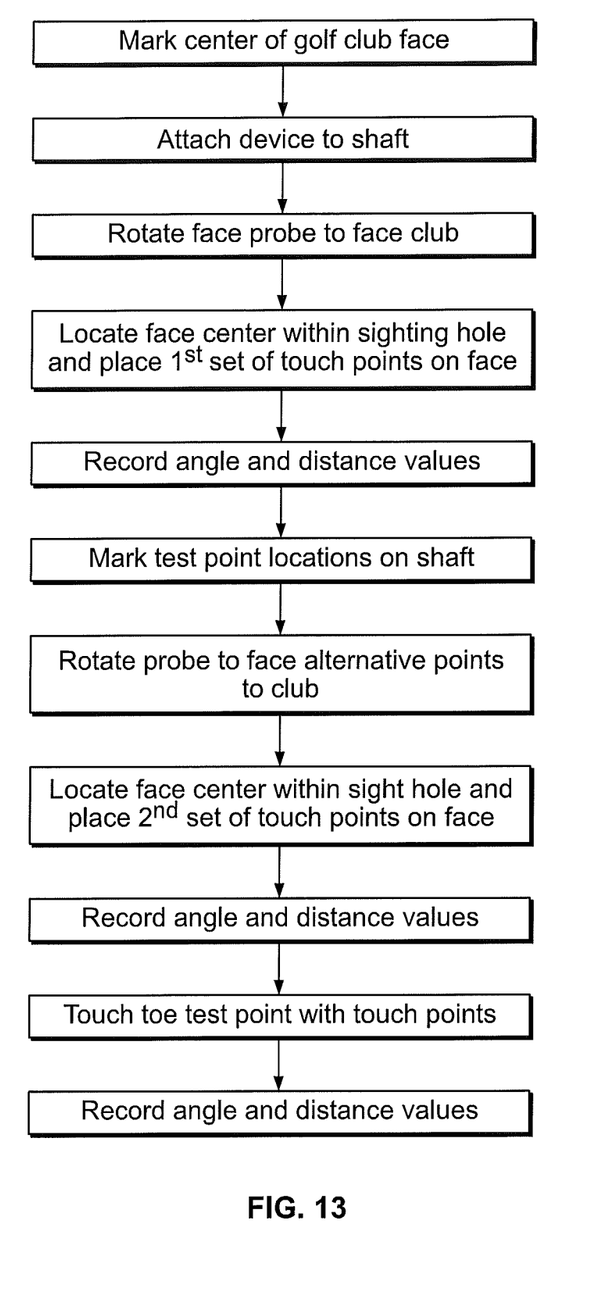
FIG. 13 is a flow chart diagram of process for using the present invention.

The near-fully assembled measuring device 10 illustrated in FIG. 12 is then adjusted to the golf club head 300 to take orientation and geometry measurements of the golf club head 300. FIG. 13 shows a process for taking measurements using the preferred embodiment of the present invention. First, a center 310 of the golf club face 320 is located and marked. This marked center 310 represents a point from which measurements will be taken using the measuring device 10.

The measurement device is then aligned with (and attached to, via the clamp 70) the golf club shaft as shown in FIG. 12. The face probe 20 is then rotated, using the retaining tube 40, so that horizontal touch points 220, 222 are facing the club face 320. The face probe is then 20 adjusted by moving the face arm 30 in or out of the retaining tube 40 so that the face center 310 of the golf club face 320 is visible within the sighting hole 210 of the face probe 20 and the horizontal touch points 220, 222 are both resting on the face 320 on opposite sides of the sighting hole 210. Tightening bolts 80, 85 (not shown) can be tightened, and then the angle and distance values visible on the gauges 90, 95 can be recorded.

At this point, marks can be placed on the shaft 350, preferably where the clamps (not shown in FIG. 12) attach to the shaft 350, to indicate test points for future analysis with, for example, a CMM. If tightening bolts 80, 85 are used, they are then loosened and the face probe 20 is rotated or otherwise adjusted again so that vertical touch points 230, 232 are facing and resting on the club face 320 as shown in FIG. 12 and the center 310 of the club face 320 is located within the sighting hole 210. Tightening bolts 80, 85 (not shown) can be tightened, and then the angle and distance values visible on the gauges 90, 95 can be recorded again.

Once angle and distance values are measured, the tightening bolts 80, 85 (if any) are loosened and the face probe 20 is adjusted by moving the probe arm 30 through the retaining tube 40 such that one of the vertical touch points 230, 232 touches a desired toe test point 330. At this point, angle and distance values visible from the gauges 90, 95 may be recorded again.

After the process outlined in FIG. 13 is completed, the values derived from the measurement device 10 can be input into an impact monitor software program or a CMM for further analysis.

The measurement device 10 disclosed herein can measure both loft and face angle at a defined standard of 56 degrees from the shaft axis. Alternative embodiments can measure loft, lie, and/or face angles at other angles from the shaft axis. It is portable and easy to use, and identifies where on the club to place markers for use with an Impact Monitor System. The measurement device 10 also provides the correct geometry relationship between the face center, face plane, golf club body, and test markers on a golf club.

The measurement device 10 disclosed herein may be made from a variety of materials known to those skilled in the art, including metals, plastics, and composites. The various pieces of the measurement device 10 disclosed herein may be made integrally or separately and then connected together using methods known to those skilled in the art. The measurement device 10 of the present invention may be used with any type of golf club, and may also be used to measure other sports equipment.

From the foregoing it is believed that those skilled in the pertinent art will recognize the meritorious advancement of this invention and will readily understand that while the present invention has been described in association with a preferred embodiment thereof, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A golf club measurement device comprising a retaining arm, a face probe connected to the retaining arm, a first gauge, and a clamp,
    wherein the face probe has at least two sides, at least two touch points on each side, and a through hole located between the two touch points on each side of the face probe,
    wherein the retaining arm is connected to the clamp, and
    wherein the first gauge provides measurement information when the clamp is attached to a golf club shaft and the through hole is lined up with a center of a golf club face.

2. The golf club measurement device of claim 1, wherein the measurement information is selected from the group consisting of loft angle, lie angle, face angle, and distance.

3. The golf club measurement device of claim 1, wherein the golf club measurement device is composed of a material selected from the group consisting of plastic and composite.

4. The golf club measurement device of claim 1, wherein at least one of the touch points is a protrusion.

5. The golf club measurement device of claim 1, wherein the face probe is rotatably connected to the retaining arm.

6. The golf club measurement device of claim 1, wherein the through hole is approximately centrally-located on the face probe.

7. The golf club measurement device of claim 1, further comprising a spacer.

8. The golf club measurement device of claim 7, wherein the retaining arm is connected to the spacer.

9. The golf club measurement device of claim 8, wherein the retaining arm is integrally formed with the spacer.

10. The golf club measurement device of claim 1, wherein the retaining arm is integrally formed with the clamp.

11. The golf club measurement device of claim 1, further comprising a retaining tube, wherein the retaining tube connects the face probe with the retaining arm.

12. The golf club measurement device of claim 11, further comprising a second gauge.

13. The golf club measurement device of claim 12, wherein the first gauge is disposed between the face probe and the retaining tube, and the second gauge is disposed between the retaining tube and the retaining arm.

14. The golf club measurement device of claim 1, wherein the clamp comprises two or more clamping mechanisms.

15. The golf club measurement device of claim 11, further comprising a first tightening bolt, wherein the first tightening bolt fixes the face probe to the retaining tube.

16. The golf club measurement device of claim 15, further comprising a second tightening bolt, wherein the second tightening bolt fixes the retaining tube to the retaining arm.

17. A method of measuring a golf club, comprising:
    locating a center of a face on the golf club;
    attaching the measurement device of claim 1 to a shaft of the golf club;
    aligning the center of the golf club face within the face probe portion of the measurement device; and
    recording measurement values provided by the first gauge on the golf club measurement device.

18. The method of claim 17, wherein the measurement device comprises two or more gauges.

19. The method of claim 17, further comprising:
    marking a point on a toe portion of the golf club;
    aligning the face probe portion with the point and
    recording measurement values provided by the first gauge.

20. The method of claim 17, wherein the measurement values are selected from the group consisting of loft angle, lie angle, face angle, and distance.

* * * * *